INVENTOR
WILLI HÄBERLE

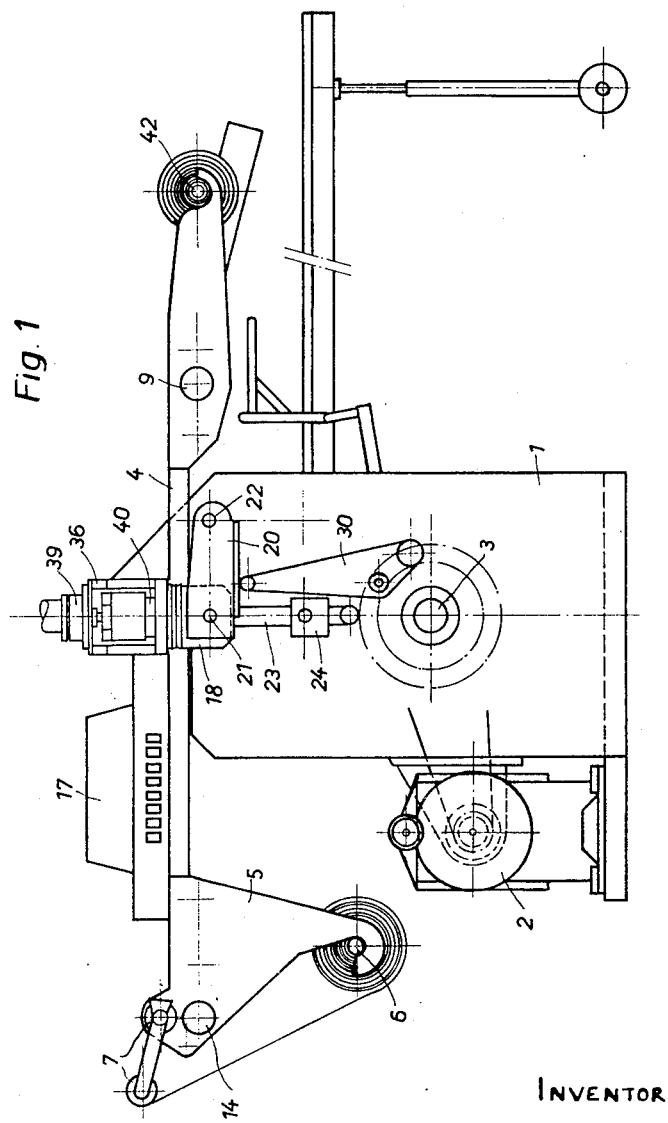

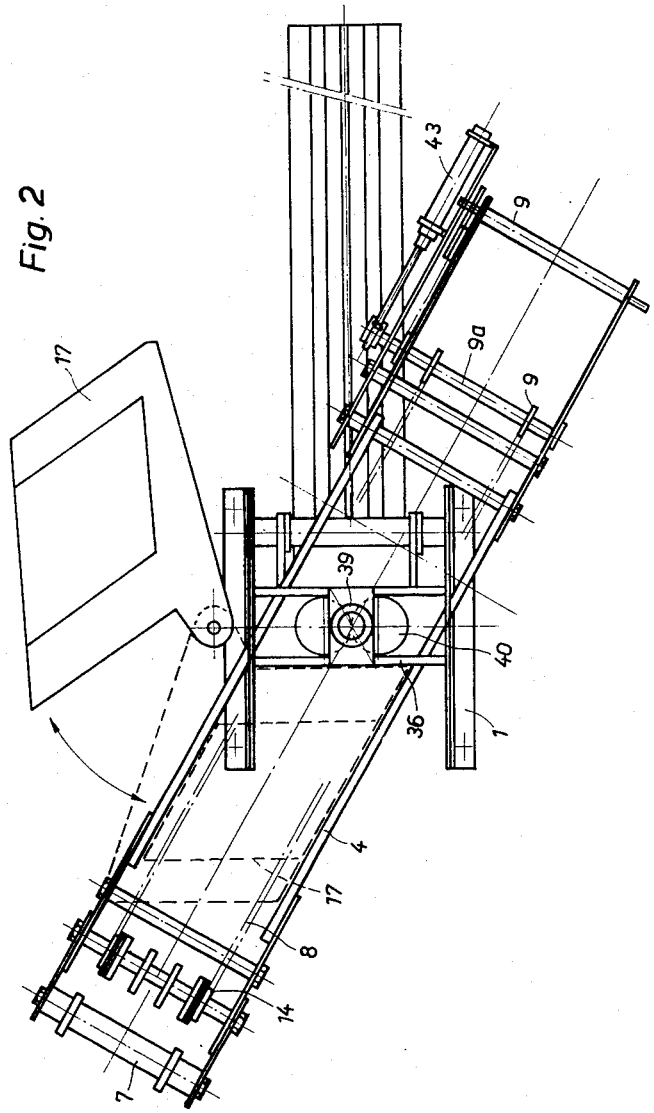

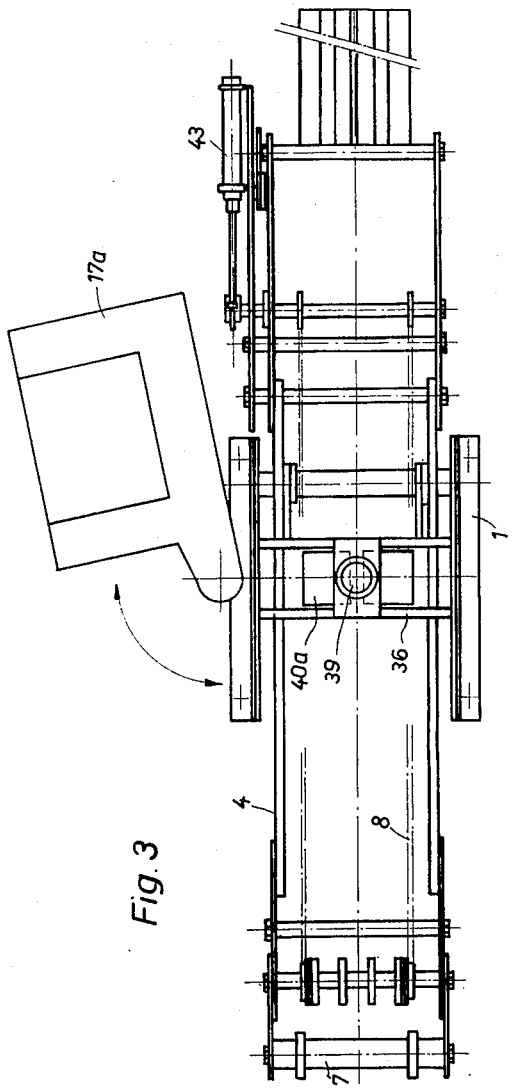

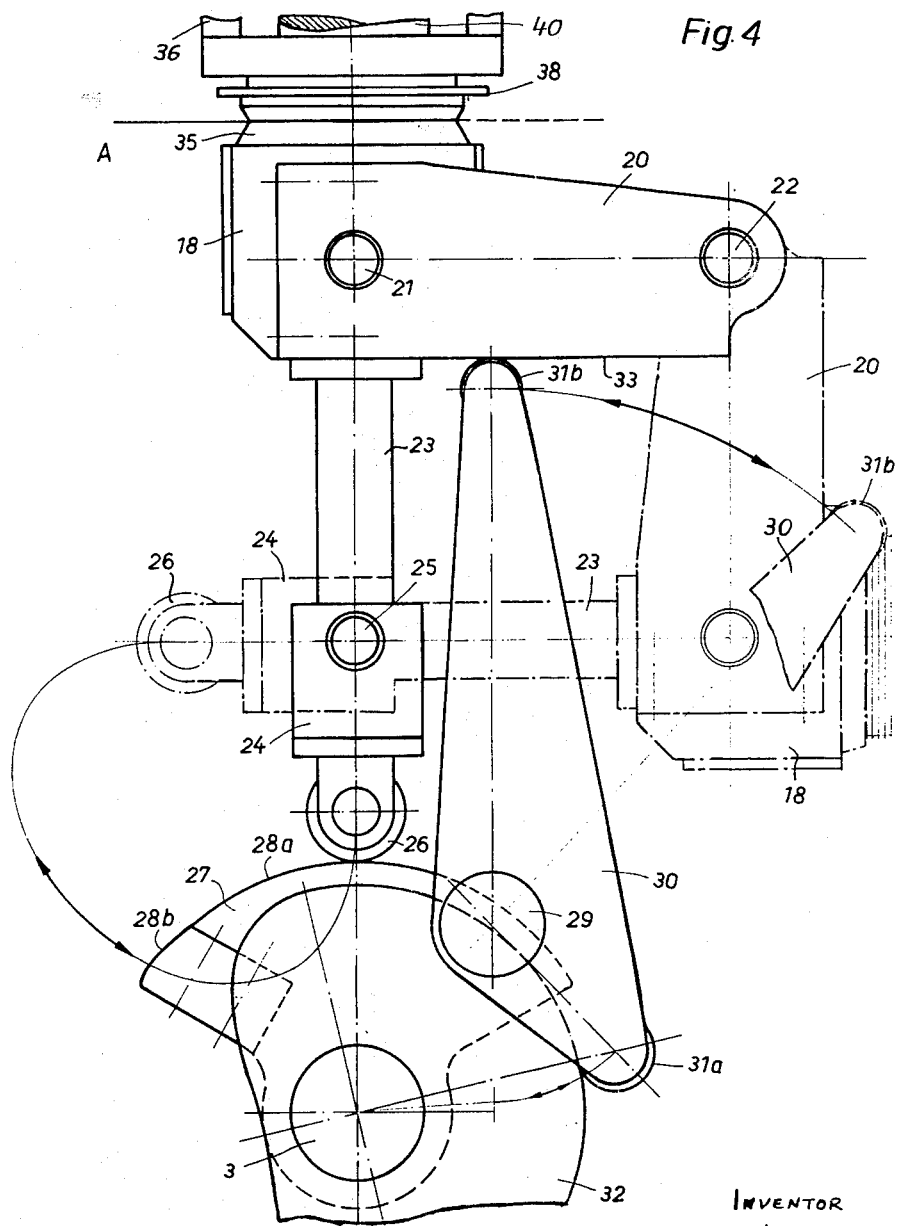

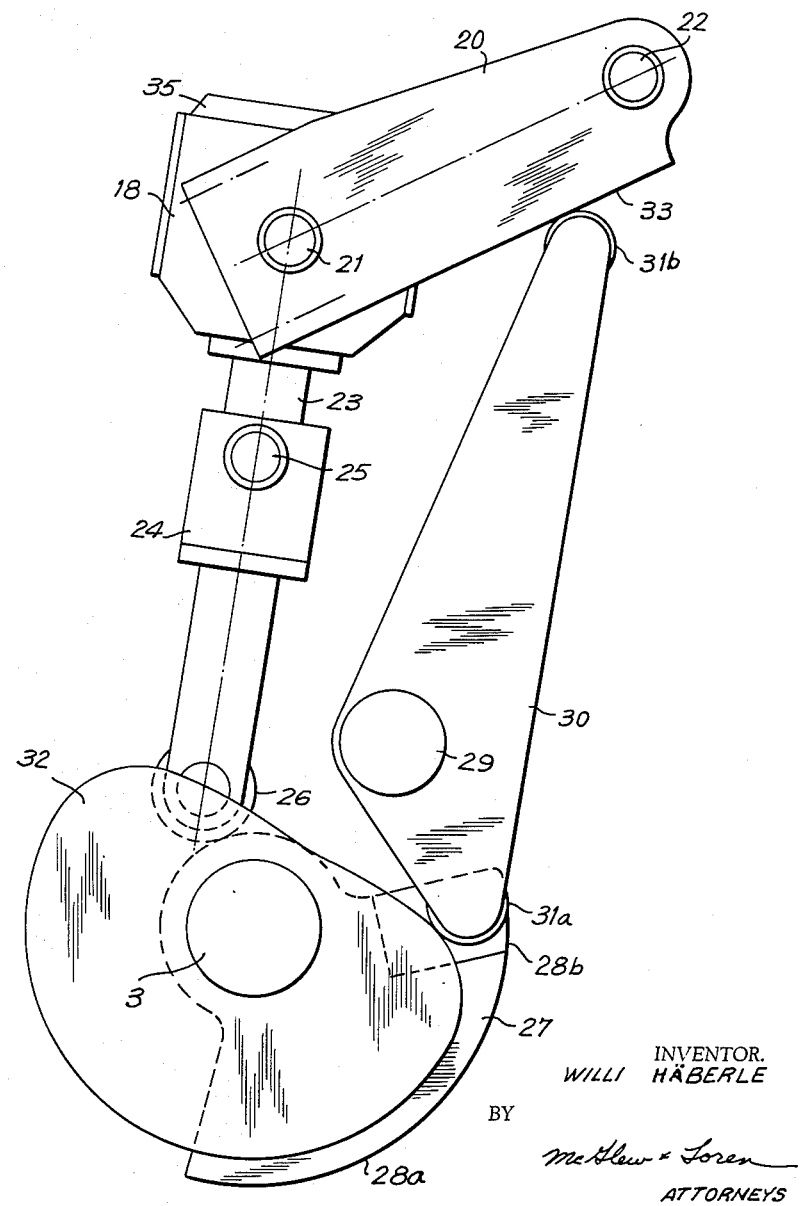

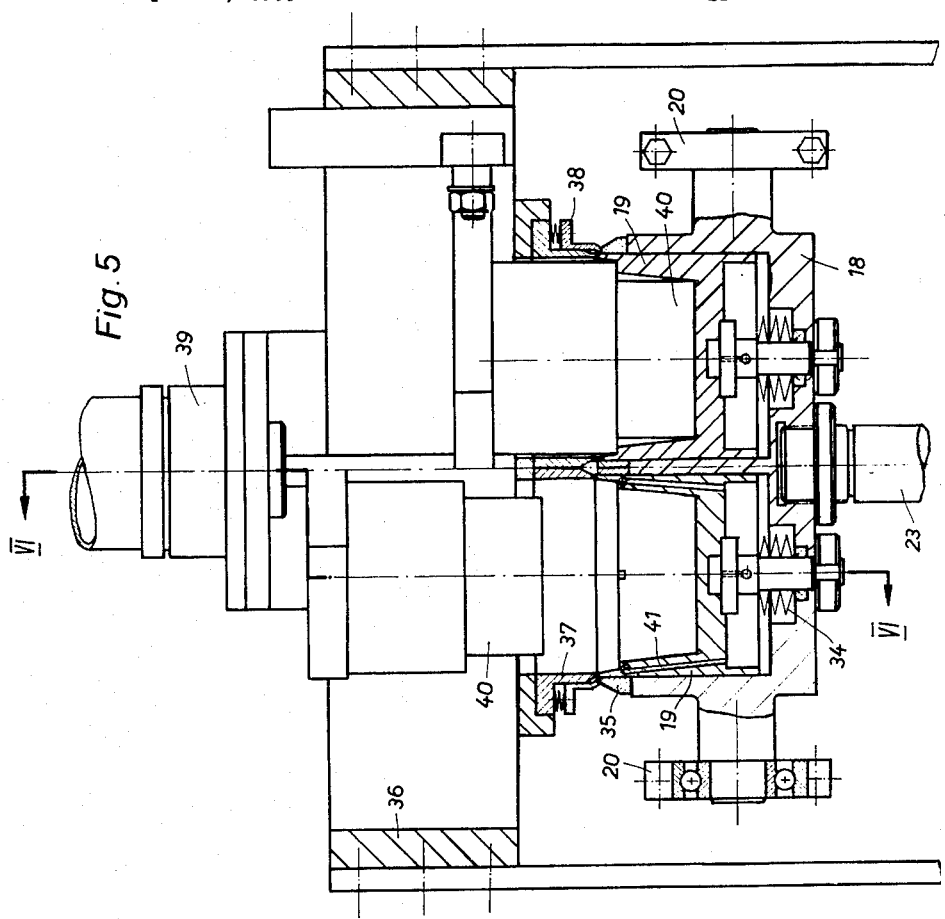
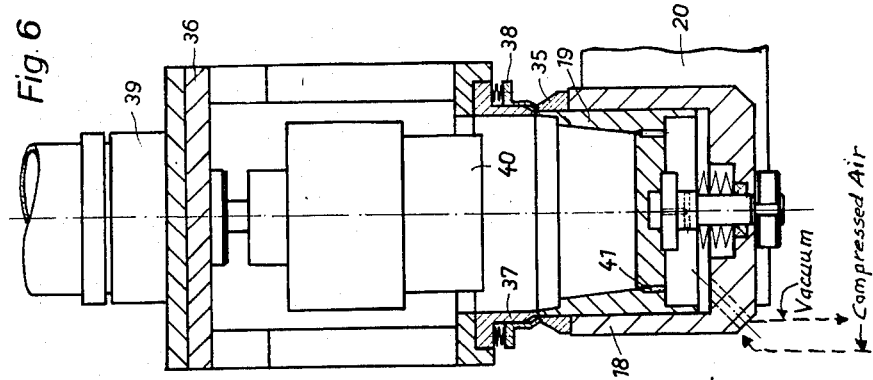

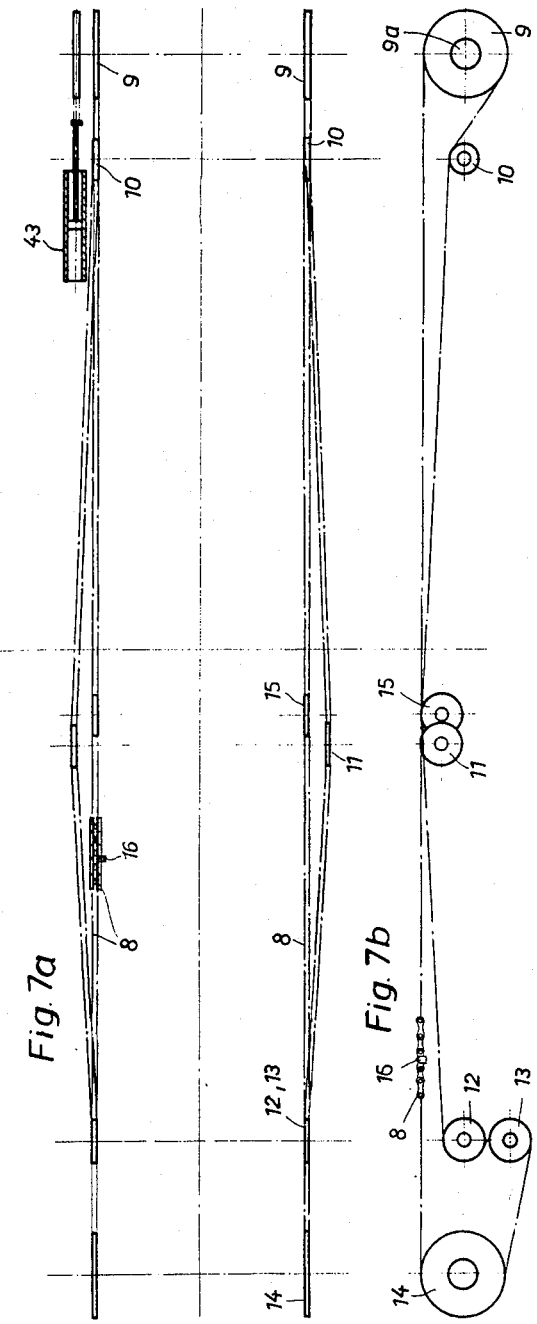

Aug. 3, 1965                    W. HÄBERLE                    3,197,816
            MACHINE FOR THE MANUFACTURE OF DEEP-DRAWN
               HOLLOW ARTICLES FROM THERMOPLASTIC
                         SYNTHETIC MATERIAL
Filed Sept. 19, 1963                                    11 Sheets-Sheet 10

INVENTOR
WILLI HÄBERLE
ATTORNEYS

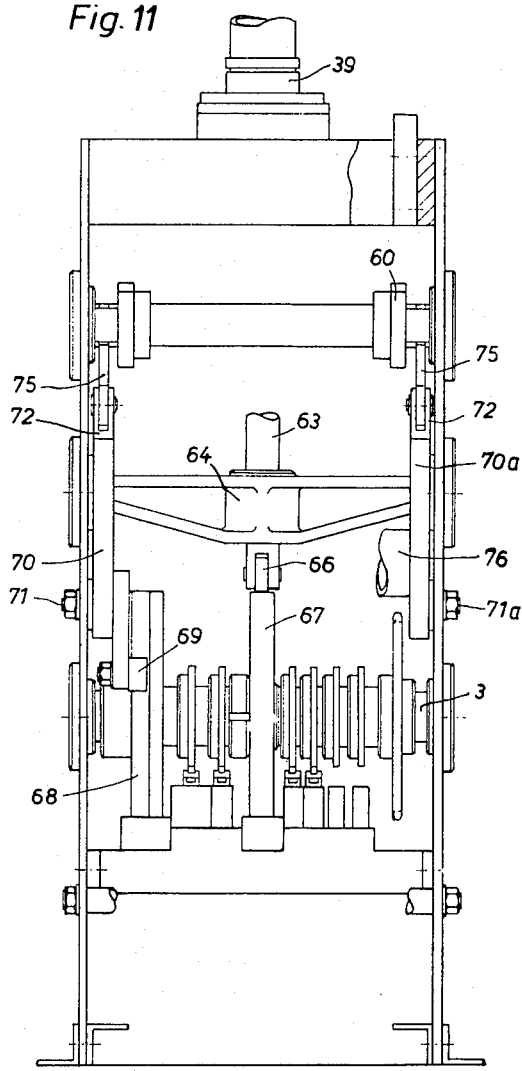

United States Patent Office

3,197,816
Patented Aug. 3, 1965

3,197,816
MACHINE FOR THE MANUFACTURE OF DEEP-DRAWN HOLLOW ARTICLES FROM THERMOPLASTIC SYNTHETIC MATERIAL
Willi Häberle, Oelixdorf, Itzehoe, Kalbsberg, Germany, assignor to Firma Dahpe A.G., Graubuenden, Switzerland
Filed Sept. 19, 1963, Ser. No. 310,074
Claims priority, application Switzerland, Sept. 20, 1962, 11,116/62
9 Claims. (Cl. 18—19)

The present invention relates to a machine for the manufacture of deep-drawn hollow articles from thermoplastic synthetic material, comprising means for transporting, heating and shaping a strip of synthetic organic plastic material, hereinafter referred to as "plastics material," means for stamping the articles out of the strip and means for removing the articles after they have been so stamped out.

In known machines of this type into which the plastics material is fed in the form of a strip, a shaping stage and a final stamping stage are provided in addition to a heating stage for softening the plastics material, the matrix can be moved with the article to the stamping stage after shaping and, after the article has been stamped out of the strip and forced clear, the matrix can be moved back again. In order to avoid this clumsy transportation of the matrix, the additional measure has been taken of removing the hollow article, which is still connected to the strip, from the matrix at the shaping stage and of transporting it independently from the deep-drawing matrix to the stamping stage. However, to ensure a perfect stamping, it is then necessary to effect a second centering or alignment of the article in the stamping tool, and it is therefore not possible to transport the plastics strip straight through the different stages. Also, the article to be transported from the shaping stage to the stamping stage must have a certain degree of rigidity, which prolongs still further the time required between shaping and stamping. Moreover there must be sufficient available material on the plastics strip for the transporting means to be able to grasp, transport and align the said strip in a troublefree manner. Narrow limits are thus set on the utilisation of the strip and a relatively large quantity of waste must always be allowed for when this method is used.

The invention consists in a machine for the manufacture of deep-drawn hollow articles from plastics material, comprising means for transporting, heating and shaping a strip of plastics material, and means for stamping the articles out of the strip and for removing the articles after they have been stamped out, wherein the means for shaping, stamping and removal form a unit with a movable tool block having at least one matrix assembly, co-operating in a first operational position, with a clamp member for securing the strip over the matrix assembly, with a shaping plunger or piston which is insertable into the matrix assembly and with a stationary stamp member for stamping the shaped hollow articles out of the strip, and being movable into a second operational position for removing the said hollow articles from the machine.

The hollow articles can accordingly be shaped and stamped out at the same stage, so that there is no need for a second centering of the strip. Not only is the time required to carry out the entire operation thereby greatly reduced in comparison with known machines, but the degree of utilisation of the plastics strip is also improved.

In order that the invention may be more clearly understood, reference will now be made to the accompanying drawings which show some embodiments thereof by way of example, and in which:

FIGURE 1 is a side view of the machine, partly cut away,

FIGURE 2 is a plan view of the machine of FIGURE 1,

Figure 8:
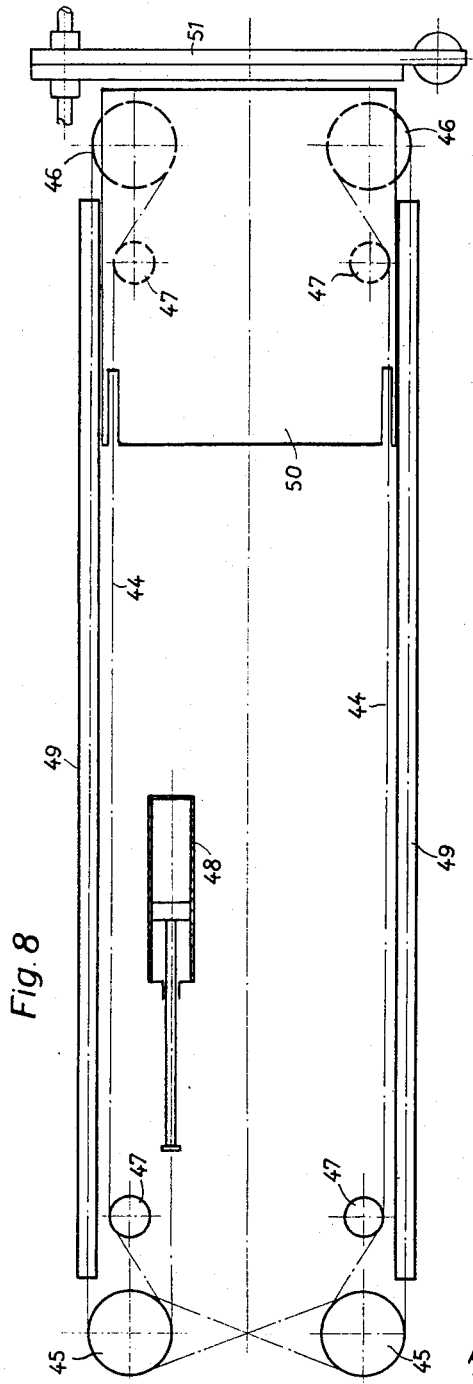
Figure 9:
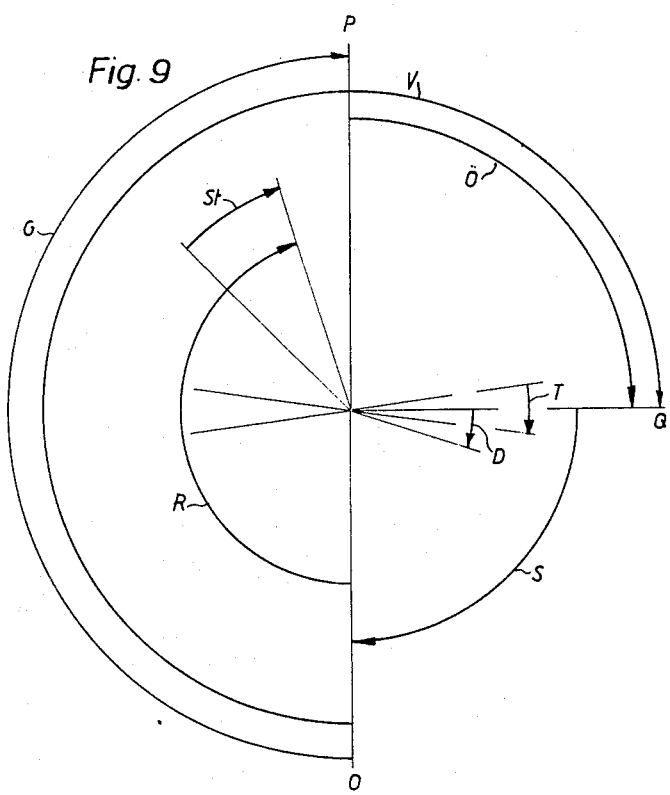
Figure 10:
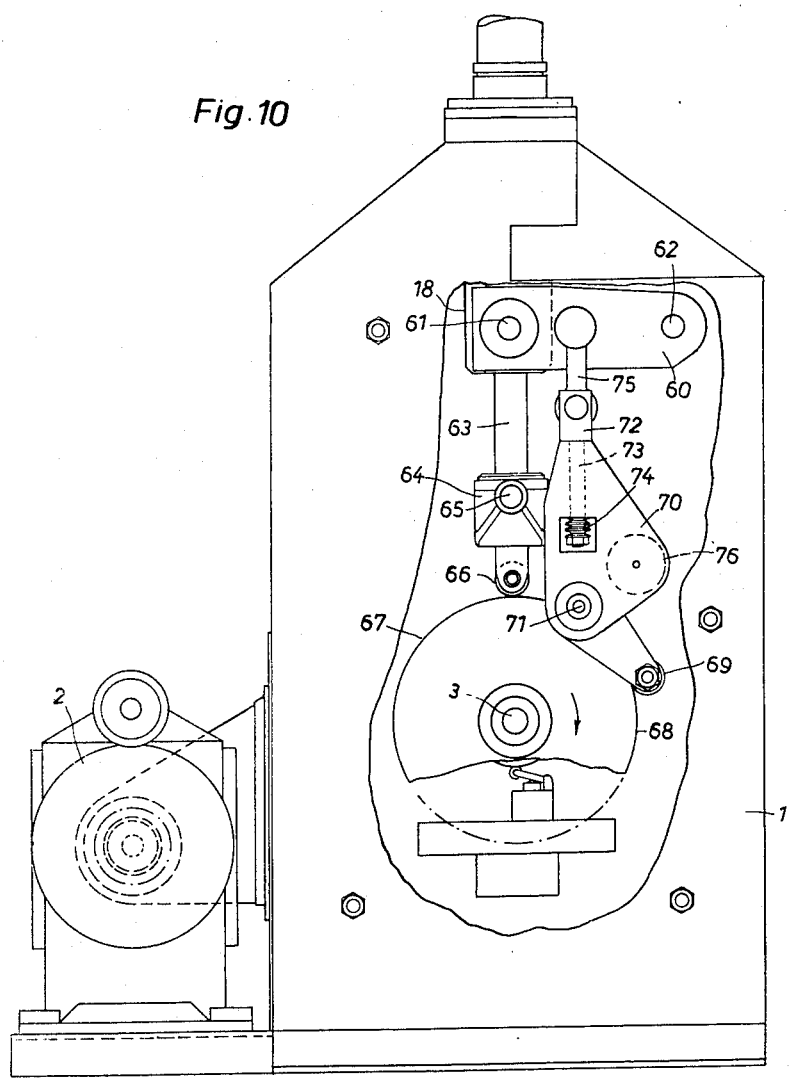

FIGURE 3 is a plan view similar to FIGURE 2, of an alternative embodiment of the machine shown in FIGURE 1, FIGURE 4 is a detail from FIGURE 1, to an enlarged scale, FIGURE 4a is a view similar to FIGURE 4 but showing the mold parts in an intermediate position, FIGURE 5 is a vertical section through the shaping and stamping stage of the machine shown in FIGURE 1, to an enlarged scale, FIGURE 6 is a vertical section along the line VI–VI in FIGURE 5, FIGURES 7a and 7b are a plan view and a side view respectively of the transporting means of the machine shown in FIGURE 1, to an enlarged scale, FIGURE 8 is a plan view of an alternative form of the means shown in FIGURE 7a, FIGURE 9 is a diagram illustrating the operational cycle of the machine shown in FIGURE 1, FIGURE 10 is a side view of part of an alternative embodiment of the machine shown in FIGURE 1, and FIGURE 11 is an elevation of the alternative embodiment shown in FIGURE 10.

Referring now to the drawings, the machine illustrated in FIGURES 1 and 2 has a frame 1 in which a main driving shaft 3, driven by an electric motor 2 arranged at one side, is mounted. A double-armed horizontal support 4 is mounted on the top of the frame, the longitudinal axis of this support extending at an angle of 30° to the axis of the main driving shaft 3 in the embodiment illustrated. A magazine roll 6 for the plastics, i.e. thermoplastic synthetic material fed into the machine in the form of a strip, is mounted on arms 5 projecting downwardly from one end of the support. At the same end, guide rollers 7 for the plastics strip are also provided, over which the strip is fed to a transport arrangement. This transport arrangement, which is arranged on the support 4, has two transport chains 8 (FIGURES 7a, 7b) guided parallel to one another at a certain distance from one another. Each of the two endless chains runs over a sprocket 9 on a driving shaft 9a, guide wheels 10, 11, 12 and 13, a reversing sprocket 14 and a further guide wheel 15 and so returns to the sprocket 9. The various sprockets are mounted in the support 4 in such a way that the upper run of the chains, which transports the strip and which runs between the sprockets 9 and 14 over the guide wheel 15, extends horizontally and parallel to the longitudinal axis of the support, while the lower, returning run of the chains is held out of the area in which the plastics strip is transported by the guide wheel 11, which is displaced slightly outwards with respect to the guide wheel 15. In order temporarily to secure the plastics strip to the chains 8 synchronously driven by the shaft 9a, teeth 16 are provided in a known manner on the sides of the chains which face one another, the edge portions of the plastics strip being pressed onto the said teeth when the machine is in operation, by means which are not illustrated in detail. A first section (in the direction of transport—arrow *a* in FIGURE 2— of the strip) of the track located between the sprockets 14 and 9, which has the upper run of the chain passing over it, serves as the heating zone. A heating arrangement 17 is mounted, for pivoting in a horizontal plane, on the frame 1. This heating arrangement is provided with electric heating elements which, when the heating arrangement has been pivoted into its operational position, as is shown in FIGURE 2 in dotted lines, lie exactly over the part of the strip which will be worked in the subsequent shaping process.

After this heating zone, the transport chains 3 run through the shaping stage located in the area of the machine frame 1. In this shaping stage, as FIGURES 4 to 6 show in detail, the means for shaping, stamping out and removing the hollow articles to be manufactured form a unit, and for this purpose include a movable tool block 18 which has two matrix assemblies 19 arranged alongside one another in the direction of the axis of the main driving shaft 3. The tool block 18 is mounted so as to pivot about a shaft 21 between two arms of a support 20, which in turn is mounted to pivot about a fixed axis 22 mounted on the machine frame 1. The arrangement is such that in the first operational position of the parts, shown in FIGURES 1 and 4 in unbroken lines, the matrix assemblies 19 of the tool block 18 are open at the top and the support 20 is horizontal. The tool block 18 is mounted on one end of a guide rod 23 which is axially slidable and guided in a bearing block 24 mounted to pivot about a horizontal axis 25 mounted on the frame 1. The other end of the guide rod 23, which projects from the bearing block 24, carries an idler roller 26 intended to co-operate with a cam 27 mounted on the main driving shaft 3. The peripheral surface of this cam 27 has a section 28a in the form of a portion of a cylinder, with, at one end, a gently rising ramp 28b (FIGURE 4). Two double-armed link arms 30 mounted on a common shaft 29 are also mounted in the frame 1. The free ends of the arms 30 carry rollers 31a and 31b respectively. The roller 31a on one arm co-operates with a cam 32 mounted on the main driving shaft 3, while the roller 31b on the other arm co-operates with a control surface 33 on the relevant arm of the support 20. As FIGURES 5 and 6 show, the fixed assemblies 19 are mounted so that they are capable of limited axial sliding motion in the tool block 18. Cup springs 34 normally hold these assemblies 19 in their outer end position in which the free edge of the assembly projects slightly beyond the surface of a stamp ring 35 secured to the tool block 18 and enclosing the assembly 19. This stamp ring 35 is intended to co-operate with a stamp ring 37 fixedly secured to a yoke 36 of the frame 1. Each stamp ring 37 is surrounded by a scraper ring 38 which is axially spring-loaded and intended to co-operate with the corresponding stamp ring 35 in the tool block 18. Also provided in the yoke 36 are two shaping pistons or plungers 40 operable by a common pneumatically operated piston arrangement 39, each of the two pistons being intended to co-operate with one of the two matrix assemblies 19. The matrix assemblies 19 are also provided in a known manner with bores 41 communicating with a chamber in the tool block 18 to which a vacuum generator or compressed air source (not shown) can be connected.

The method of operation of the machine described above will now be described in detail. Let us assume that the movable parts of the machine are in the position illustrated in FIGURES 1, 4, 6 and to the left of FIGURE 5, i.e. the tool block 18 has been pivoted into its upper position, in which the matrix assemblies 19 apply the stationary plastics strip A (FIGURE 4) against the stationary stamp ring 37. The roller 26 on the guide rod 23 then rests on the cylindrical peripheral section 28a of the cam 27. The strip-transporting means are stationary and the shaping plunger 40 is in its upper end position. The individual working elements of the machine are controlled in such a way that starting from the aforementioned initial position, shown in FIGURE 9 at 0, the plunger or piston 40 moves downwards and a vacuum is simultaneously generated in the chamber in the matrix closed at the top by the (preheated) plastics strip. As will be seen from FIGURE 9, the vacuum is maintained (sector V) for 75% of a complete operational cycle. The mechanical shaping (sector R) begins at the same moment as the generation of the vacuum in the chamber in the matrix, the pistons 40 being lowered in the corresponding chambers in the matrix (to the right of FIGURE 5). Under the action of the vacuum combined with the pressure of the pistons 40, the plastics strip is deformed into the two matrix assemblies 19 to form cup-shaped blisters which must now be stamped out of the strip. As will be seen from FIGURE 4, as the cam 27 continues to rotate, the roller 26 runs on to the ramp 28b of the cam (sector St in FIGURE 9). This forces the rod 23 in the guide block 24 upwards so that the tool block 18 is also moved upwards by a corresponding distance. Since the matrix assemblies 19 rest on the stationary stamp rings 37, they do not participate in this rising movement of the tool block 18, so that the latter slides past the matrix assemblies over the stamp rings 37, the cup springs 34 being compressed. Meanwhile the plastics strip is stamped around the shaped cups and spring-loaded scraper rings 38 are simultaneously pushed back by the stamp rings 35. As the cam 27 continues to rotate, its ramp 28b frees the roller 26 and therefore the guide rod 23, so that the tool block 18 moves back again into the initial position shown to the left of FIGURE 5, under the action of the cup springs 34. As the sector G in FIGURE 9 shows, the matrix remains closed from the point 0 to half way round the cycle; on reaching the mid-point of the cycle, not only is the tool block 18 returned into its initial position, as aforementioned, but the plungers 40 are also withdrawn again by the pneumatic piston arrangement 39. At this point the matrix begins to open, and this opening stage extends over 25% of the operational cycle (sector O in FIGURE 9). The matrix is opened by the cam 32. At the point P of the operational cycle, one end of the semi-cylindrical peripheral surface of the said cam 32 has reached the roller 31a on the arm 30. By virtue of the decrease in the radius of the cam, further rotation of the cam 32 pivots the arm 30 about its axis 29 clockwise in FIGURE 4, the roller 31b of the arm 30 moving into the position shown in FIGURE 4 in chain-dotted lines. Under the action of the weight of the tool block 19 combined with the action of springs (not shown) the support 20 with its guide track for the roller 31b follows and pivots through 90° about the axis 22, counterclockwise in FIGURE 4. This pivoting movement of the support 20 is also participated in by the tool block 18 mounted in it. This block 18 is pivotable about the shaft 21 in the support 20, as aforementioned, and, as the block 24 guiding the rod 23 is fixed in position but pivotable about its axis 25, the tool block 18 pivots through 90° clockwise in FIGURE 4 during the aforementioned counter clockwise pivoting movement of the support 20, while the rod 23 in the guide block 24 is axially reciprocated. After the support 20 has pivoted through 90°, it takes, along with the tool block 18, the position shown in FIGURE 4 in chain-dotted lines. The cups stamped out of the plastics strip during the aforementioned stamping stroke of the tool block 18 are kept in the matrix assemblies by the vacuum maintained until the end of the opening stage, as shown in FIGURE 9. This ensures not only troublefree removal of the cups from the point at which they are formed but also inner contact of the cups with the metal wall surface of the matrix assemblies. This achieves a particular good transfer of heat from the plastics material to the matrix, so that, when the tool block is pivoted into the horizontal terminal position shown in FIGURE 4 in chain-dotted lines, the material constituting the cups is cooled to such an extent that the cups can immediately be ejected from the matrix assemblies without danger of undesirable deformation. As already stated, the vacuum present in the matrix assemblies is released at the point Q (FIGURE 9) in the operational cycle, when the matrix opening stage (sector O) is over. This is done by blowing compressed air into the matrix assemblies 19 through the same channels 41 (FIGURES 5, 6). This phase of the operation is shown in FIGURE 9 by the sector D. The cooled cups are thereby blown out of the matrix assemblies. Arrangements are preferably made for the cups, which have been blown a few millimetres by compressed air out of and away from the matrix assemblies along a horizontal axis, to be fully removed from the matrix assemblies by appropriate pincers engaging behind the free edges of the cups, the said pincers also stacking the cups on a pile moving away from the machine intermittently in synchronism with the supply of new cups. On reaching the point Q (end of the pivoting movement of the tool block 19) the cam 32 has rotated on the main driving shaft 3 to an angular position such that the roller 31a runs off that part of the cam which has the smallest radius on to the cylindrical peripheral portion of the cam once again. This causes the arm 30 to swivel back counterclockwise in FIGURE 4 into the position shown in FIGURE 4 in unbroken lines, in which position the roller 31a reaches the cylindrical portion of the cam. At this stage the roller 31b presses against the control surface 33 of the support 20 in the direction pivoting the said support back about its pivot axis 22, into the position shown in FIGURE 4 in unbroken lines. This also pivots the tool block 18 back into the position in which the matrix is closed, as is indicated in FIGURE 9 by the sector S occupying 25% of the operational cycle. The unit shaping, stamping and removing the cups has returned to its initial point in the operational cycle on reaching the point 0. It should be noted that immediately before the beginning of the closure movement of the tool block, shown by the sector T in FIGURE 9, the chain drive for the plastics strip is engaged so that a strip section momentarily heated by the arrangement 17 is transported to the shaping stage located underneath the raised plungers 40. This relatively short transport stage is over quite soon after the beginning of the closure movement of the tool blocks 18, as sector T in FIGURE 9 shows. The stamped strip waste is advanced concurrently with the supply of a new strip section to the shaping stage. In the embodiment shown in FIGURE 1, a take-up roller 42 is mounted at the exit end of the support 4, the waste strip being wound on to this roller.

For ease of supervision, only a single roller guide has been provided between the arm 30 and the cam 32 in the embodiment illustrated. In order to be able to prevent the roller 31a from jumping when the machine is run at high speeds, it is advantageous for this roller not to be applied against the outer periphery of the cam 32 by spring tension, but for it to be forcibly guided in a corresponding guiding groove in the cam.

In the embodiment described, the transport chains 8 guided over sprockets with horizontal axes are intermittently driven by a pneumatic piston arrangement 43 (FIGURES 2, 7a), the drive being transmitted to a driving shaft 9a at the exit end, as already stated. In the alternative embodiment shown in FIGURE 8, the drive chains 44 are guided around sprockets with vertical axes, each chain passing round one sprocket 45 at the entry end and one sprocket 46 at the exit end with one pair each of guide wheels 47 in between. The two chains 44 provided with upwardly projecting teeth are driven by a pneumatic piston arrangement 48 acting on one sprocket 45 and thence via a transverse auxiliary chain synchonously acting on the other sprocket 45. The outer chain run located directly between the sprockets 45 and 46 runs in a tube 49 provided on the support 4 of the machine so that the inner chain run running over the guide wheels 47, which transports the strip, is protected by the said tube from any undesirable interference such as may be imparted by swinging or slapping of the outer chain run, for example. In addition, using this arrangement of the transport chains, the actual height of the transport arrangement need only be very small. In contrast to the embodiment described above, in which the waste strip was led on to a take-up roller, the alternative embodiment shown in FIGURE 8 has an off-loading surface 50 of sheet metal or the like provided at the exit end of the chain drive, sloping upwards towards the rear from tongues projecting under the chains 44, so that the waste strip running on to this surface is removed from the teeth on the chains and runs up the slope away from the chains. A cutting arrangement 51 operating in synchronism with the supply of stamped strip sections is provided behind the off-loading or removal sheet 50 and cuts the waste strip supplied to it into individual pieces which drop into a waste container. This type of waste removal has considerable advantages over winding the waste strip on to a roller, as considerably less room is required for the waste storage and the support does not have to be loaded by voluminous and relatively heavy strip rollers.

In the embodiment shown in FIGURES 1 and 2, the support 4 is arranged with its longitudinal axis at an angle of 30° to the pivotal plane of the tool block 18, and this pivotal plane is perpendicular to the plane passing through the axes of the two matrix assemblies. This arrangement was selected so as to be able to make maximum utilisation of the plastics strip in the manufacture of round cups in pairs, as in this case the stamps are made in two off-set rows. However, if square cups are to be manufactured, these are preferably stamped out in two non-staggered rows and in this case the longitudinal axis of the support 4 is preferably located in the pivotal plane of the tool block, as is shown in FIGURE 3, for example. The arrangement may be such that the support 4 is adjustable in its angular position with respect to the pivotal plane of the tool block. However, in the right-angled position of the tool block shown in FIGURE 3 a heating arrangement 17a with a different shape must be provided, and the heating arrangement is preferably pivoted to the frame in such a manner that it can be interchanged, so as to allow for this. Whereas the heating arrangement in the embodiment shown in FIGURE 1 has to heat up a section of the strip in the form of a parallelogram and consequently needs correspondingly arranged heating elements, the strip section to be heated in the embodiment shown in FIGURE 3 is rectangular, requiring a corresponding arrangement of the heating element. It goes without saying that, in the manufacture of square cups, the matrix assemblies and the shaping plungers 40a are accordingly square. In other respects this alternative embodiment corresponds to the embodiment already described with reference to FIGURE 1.

Some additional modifications of detail are shown in the embodiment illustrated in FIGURES 10 and 11. The support and the shaping plungers correspond to those in the embodiment described above and have therefore been omitted from this embodiment. This embodiment also has the tool block 18 (FIGURE 10) mounted to pivot through 90° (clockwise in FIGURE 10) about a shaft 61 between the rigidly interconnected arms of a support 60, which is in turn mounted to pivot about a fixed axis 62 mounted on the machine frame 1 in the opposite direction to the tool block 18. The guide rod engaging with the tool block 18 has the reference numeral 63 and the guide block serving as a slide for this rod has the reference 64. The guide block in the frame is mounted to pivot about an axis 65 and the free end of the rod 63 carries a roller 66 to co-operate with the cam 67, which, as in the embodiments described above, is mounted on the main driving shaft 3 driven by the motor 2 mounted to one side of the frame 1, and, as in the embodiment first described, all the cams controlling the various machine functions are mounted on the said main driving shaft 3. This embodiment also has a cam 68 with which a roller 69 on one arm of a double-armed lever 70 co-operates. The other arm on the said lever 70, which is mounted on the frame 1 to pivot about an axis 71, carries a link head 72 which is guided by a rod 73 in a longitudinal recess in the aforesaid lever arm. This rod 73 is internally supported by a spring 74 which enables a limited axial sliding of the rod outwards to be effected against the action of the said spring, which is equivalent to extending the arm 70. A guide rod 75 is mounted on the link head 72 and engages at its other end between the axes 61 and 62 on the support 60. It should be noted that the arm 70 is constructed as a double-armed lever co-operating with a cam 68 only on one side of the machine, while on the other side of the machine a single-armed lever 70a, rigidly connected by a transverse rod 76 to the arm 70, is provided which is mounted on the frame 1 about an axis 71a coaxial with the axis 71 and which, like the arm 70, has a link head 72 linked by a guide rod 75 to the other arm of the support 60. With an arrangement as described above (if the shaft 3 is rotated clockwise in FIGURE 10, the arm 70 is pivoted clockwise by the cam 68, which has a similar shape to the cam 32 in the first embodiment, out of the position corresponding to the closed state of the tool block 18, pivoting the support 60 counterclockwise through 90°, which in turn pivots the tool block 18 through 90° in the opposite direction into the open position of the tool block. The arm 70a accurately and rigidly guides the tool block via the elements 72 and 75 co-operating with it and via the transverse rod 76. In all other respects the operation of this embodiment exactly corresponds to that of the embodiment shown in FIGURE 1. It should be noted that this embodiment may also be provided with corresponding cams with a forcible guide for the rollers in the form of a groove instead of the cams 67 and 68 with their curved track on their periphery for the rollers 66 and 69.

In the machines described above, it is assumed that apart from the mechanical action of the shaping plunger only vacuum acting on the underside of this strip is used to shape the plastics material. However, it is also possible simultaneously to generate a positive pressure over the strip, using compressed air, ensuring a better contact still of the shaped strip material with the wall surface of the matrix assembles. This gives a more rapid heat transfer still from the plastics material to the matrix, allowing for a higher rate of pivoting motion of the tool beam.

In deep-drawing machines hitherto known, the actual shaping and cooling time accounts for at the most about 50% of an operational cycle. However, as the operational speed of any machine is determined by the length of the cooling period, it will be appreciated that it is not possible to exceed a certain limit. The present invention makes it possible to increase the period of contact for cooling the cup material to 75% of the cycle (FIGURE 9), making it possible to increase the output of the machine by a theoretical 50% or more than in former constructions. Thus the limitation of the output of this machine should not be regarded as being a function of the cooling period required, but rather as being determined by the maximum possible speed of the pivoting and raising of the tool block.

By the term "forming member," as used hereinafter, is meant either a matrix 19 or a shaping plunger 40.

What I claim is:

1. Apparatus as claimed in claim 8, wherein said second guide arm is forcibly engaged with a guiding surface of the support.

2. Apparatus as claimed in claim 8, wherein said second guide arm is connected by an auxiliary arm to the support in a positive manner.

3. Apparatus as claimed in claim 8, wherein the first forming member is spring-loaded and mounted to have limited movement in the tool block so that when the tool block is in its article forming position, the first forming member meanwhile being stationary, it can effect a severing stroke under the action of the second control cam.

4. Apparatus as claimed in claim 6, wherein the tool block has two adjacent first forming members and is pivotal in a vertical plane perpendicular to the plane passing through the axes of the first forming members.

5. Apparatus as claimed in claim 6, wherein said heating means is pivotally mounted on a machine frame included in said apparatus so as to pivot into and out of its operational position.

6. Apparatus for manufacturing deep-drawn hollow articles from strip plastics material comprising, in combination, means for transporting a strip of plastics material along a working path; heating means along said path to heat and soften selected areas of the strip; an article forming, severing and removing station along said path beyond said heating means; a tool support block at said station; at least one first forming member carried by said block, at least one second forming member at said station reciprocable substantially normal to said strip to cooperate with said first forming member to deform a portion of the strip to form an article; at least one stationary severing member at said station cooperable with said support block to sever a formed article from the strip; said tool support block being movable between an article forming position, in which a first forming member on said block is aligned with a second forming member and cooperates with a severing member to clamp a strip therebetween, and an article removing position in which a first forming member on said block faces laterally outwardly of said path and substantially normal to the direction of reciprocation of said second forming member; a support pivotally mounting said tool support block; means pivotally mounting said support for swinging movement of said block, in an arcuate path, about the pivot axis of said support; a guide arm connected to said block and cooperating with said support, during movement of said block from said article forming position to said article removing position, first to move said block and a first forming member thereon normally away from the strip, and then to pivot said block in said support to face the first forming member thereon laterally outwardly of said path, and to retrace such movement, in the reverse sequence, during return of said block to the article forming position; means operable, when said block is in the article forming position, to move said second forming member into cooperating relation with said first forming member to form the article in the strip; said first forming member having limited displacement relative to said block; and means operable, during cooperation of said first and second forming members, to move said block relative to the first forming member thereon and relative to said severing member, to sever the formed article from the strip for transport, in contact with the first forming member, to the article removal position.

7. Apparatus, as claimed in claim 6, wherein said tool support block is mounted in said support for pivotal movement through 90°, said support being mounted for pivotal movement, about its pivotal axis, through substantially 90° in a direction opposite to the direction of pivotal movement of said block.

8. Apparatus, as claimed in claim 6, in which said working path lies in a substantially horizontal plane and said second forming member is reciprocable substantially vertically; the pivot axes of said block and of said support extending substantially horizontally and the pivot axis of said support being fixed and located at substantially the height of the pivot axis of said block when said block is in its article forming position; a second guide arm engaged with said support; a first control cam engaged with said second guide arm to effect such swinging movement of said block about the pivot axis of said support; means pivotally and slidably mounting said first-mentioned guide arm for pivotal movement about a stationary substantially horizontal axis through 90°; said means operable to move said block relative to the first forming member thereon and relative to said severing member including said first guide arm and a second control cam engaged with said first guide arm.

9. Apparatus, as claimed in claim 6, wherein the first forming members are female members; means for generating a vacuum in the first forming members at least during movement of the tool support block from the article forming position to the article removing position; and means for supplying compressed air to the first forming members in the article removing position of the tool support block to eject the hollow articles from the first forming members.

References Cited by the Examiner

UNITED STATES PATENTS

| 1,273,009 | 7/18 | Simmons | 18—19 |
| 1,879,555 | 9/32 | Simmons | 18—19 |
| 2,282,423 | 5/42 | Kopitke | 18—19 |
| 2,377,392 | 6/45 | Wiley | 18—19 X |
| 2,891,280 | 6/59 | Politis | 18—19 |

WILLIAM J. STEPHENSON, *Primary Examiner.*